(12) United States Patent
Wang et al.

(10) Patent No.: US 9,546,737 B1
(45) Date of Patent: Jan. 17, 2017

(54) SOLENOID VALVE

(71) Applicants: James Wang, Taichung (TW); Shui-Ho Wang, Taichung (TW)

(72) Inventors: James Wang, Taichung (TW); Shui-Ho Wang, Taichung (TW)

(*) Notice: Subject to any disclaimer, the term of this patent is extended or adjusted under 35 U.S.C. 154(b) by 0 days.

(21) Appl. No.: 14/848,375

(22) Filed: Sep. 9, 2015

(51) Int. Cl.
*F16K 15/18* (2006.01)
*F16K 31/12* (2006.01)
*F16K 11/06* (2006.01)

(52) U.S. Cl.
CPC ........... *F16K 15/18* (2013.01); *F16K 11/06* (2013.01); *F16K 31/12* (2013.01); *Y10T 137/86614* (2015.04)

(58) Field of Classification Search
CPC ............. Y10T 137/86614; Y10T 137/7761; F16K 15/18; F16K 11/06; F16K 31/12
USPC ............. 251/25, 26, 27, 30.01; 91/51
See application file for complete search history.

(56) References Cited

U.S. PATENT DOCUMENTS

| | | | | |
|---|---|---|---|---|
| 955,896 A * | 4/1910 | Morrison | ............ | F16K 31/1635 91/179 |
| 2,363,111 A * | 11/1944 | Bennett | ............. | B23Q 5/26 137/625.25 |
| 2,973,746 A * | 3/1961 | Jupa | ............. | F15B 13/0438 137/625.6 |
| 3,550,621 A * | 12/1970 | Malinowski | ........ | F15B 13/0817 137/625.64 |
| 3,556,154 A * | 1/1971 | Kramer | ............. | F15B 13/043 137/625.64 |
| 3,804,120 A * | 4/1974 | Garnett | ............. | F15B 13/0433 137/625.64 |
| 4,257,572 A * | 3/1981 | Neff | ............. | F15B 13/0431 137/513.5 |
| 4,543,875 A * | 10/1985 | Imhof | ............. | F15B 13/0402 137/625.63 |
| 4,569,273 A * | 2/1986 | Anderson | .......... | F15B 13/0435 137/596.2 |
| 4,646,785 A * | 3/1987 | Ruedle | ............. | F16K 27/041 137/625.64 |
| 4,741,364 A * | 5/1988 | Stoss | ............. | F15B 13/0402 137/625.6 |
| 4,825,907 A * | 5/1989 | Johnson | ............. | F15B 13/0402 137/625.25 |
| 5,042,832 A * | 8/1991 | Takahashi | ............. | B60G 17/018 137/625.64 |
| 5,437,306 A * | 8/1995 | Asou | ............. | F15B 13/0821 137/625.64 |

(Continued)

*Primary Examiner* — Kevin Murphy
*Assistant Examiner* — David Colon Morales

(57) ABSTRACT

A solenoid valve includes a housing including a channel, a single-acting through hole, a double-acting through hole, a spring biased spool in the channel, a lateral outlet communicating with the double-acting through hole, and a hole element passing through an edge of the channel to communicate with both the double-acting through hole and the channel; a switch on the housing and including an axial tunnel, a shaft in the tunnel, a lateral single-acting hole communicating with the tunnel, a double-acting hole communicating with the tunnel, and a linking hole perpendicular to the tunnel but not communicating therewith; a pilot valve on the switch; a base at a bottom of the housing, and a spring biased check valve at a lower opening of the housing and the base, the check valve communicating with the single-acting through hole.

7 Claims, 18 Drawing Sheets

(56) References Cited

U.S. PATENT DOCUMENTS

| | | | | |
|---|---|---|---|---|
| 5,447,285 A * | 9/1995 | Yokogi | ............ | F15B 20/004 |
| | | | | 251/27 |
| 5,588,465 A * | 12/1996 | Witowski | ............ | F15B 13/0402 |
| | | | | 137/596.16 |
| 5,603,355 A * | 2/1997 | Miyazoe | ............ | F15B 13/0853 |
| | | | | 137/625.64 |
| 5,819,783 A * | 10/1998 | Blatt | ............ | F15B 1/02 |
| | | | | 137/271 |
| 5,913,577 A * | 6/1999 | Arndt | ............ | B60T 15/028 |
| | | | | 137/625.64 |
| 6,109,291 A * | 8/2000 | Yoshimura | ............ | F15B 13/0402 |
| | | | | 137/269 |
| 6,192,937 B1 * | 2/2001 | Fagerlie | ............ | F15B 13/0402 |
| | | | | 137/625.63 |
| 6,209,580 B1 * | 4/2001 | Foster | ............ | F15B 13/0402 |
| | | | | 137/596.12 |
| 7,677,264 B2 * | 3/2010 | Miyazoe | ............ | F16K 31/426 |
| | | | | 137/269 |
| 8,573,558 B2 * | 11/2013 | Wang | ............ | F15B 15/12 |
| | | | | 251/27 |
| 8,973,610 B2 * | 3/2015 | Ma | ............ | F15B 13/0422 |
| | | | | 137/596.14 |
| 2008/0163939 A1 * | 7/2008 | Williams | ............ | F15B 13/0402 |
| | | | | 137/596.14 |
| 2012/0211681 A1 * | 8/2012 | Wang | ............ | F16K 31/1635 |
| | | | | 251/30.01 |
| 2012/0285568 A1 * | 11/2012 | Schulz | ............ | F15B 13/0435 |
| | | | | 137/625.64 |

* cited by examiner

SOLENOID VALVE

BACKGROUND OF THE INVENTION

1. Field of the Invention

The invention relates to solenoid valves and more particularly to such a solenoid valve including a check valve in a housing so that gas may flow to air chambers and spaces respectively without lubrication oil and water accumulation, and the valve can be opened or closed manually in response to insufficient gas or power off.

2. Description of Related Art

A conventional solenoid valve shown in FIGS. 11 and 12 is characterized in the following. In a fail-safe mode a pilot solenoid valve 53 is electrically powered to open a port 531. Next, a compressed air source 5 supplies compressed air to the pilot solenoid valve 53 via a path 513, a switch 55, and compress a spool 5100 accordingly. The compressed air source 5 further supplies compressed air to an air chamber 611 of a pneumatic cylinder 6 via a first port 515 and an independent check valve 612 attached to the cylinder 6. Further, air in the air chamber 611 flows to a hole element 510 in a body 51 via a 1B port 64 and an air inlet 512. Furthermore, air flows to a first space 67 in the pneumatic cylinder 6 via a second port 516 and a 1C port 65. And in turn, two pistons 62 are pushed toward two adjacent second spaces 68 respectively. As such, a pinion 69 in the pneumatic cylinder 6 rotates counterclockwise to open the valve.

Compressed lubricated air may flow to the pneumatic cylinder 6 via the air chamber 611 first before the air flow to the first space 67 and the second space 68 and due to the density, the lubricated oil and moisture may accumulate in the air chamber 611 which result the insufficient lubrication to both the first space 67 and the second space 68 and make the space of the air chamber 611 decreased. In the event of air failure, insufficient air volume may be supplied from the air chamber 611. As a result, operation may be malfunctioned. Thus, the need for improvement still exists.

SUMMARY OF THE INVENTION

It is therefore one object of the invention to provide a solenoid valve comprising a housing including a longitudinal channel, a longitudinal single-acting through hole, a longitudinal double-acting through hole, a spring biased spool disposed in the channel, a lateral outlet communicating with the double-acting through hole, a hole element passing through an edge of the channel to communicate with both the double-acting through hole and the channel, a first hole open to an outer surface of the housing, a second hole open to the outer surface of the housing, a third hole open to the outer surface of the housing, a fourth hole open to the outer surface of the housing, and a fifth hole open to the outer surface of the housing wherein the second hole, the third hole, the fourth hole, and the fifth hole communicate with the channel; a switch disposed on the housing and including an axial tunnel, a shaft disposed in the tunnel, a lateral single-acting hole communicating with the tunnel, a lateral double-acting hole communicating with the tunnel, and a linking hole perpendicular to the tunnel but not communicating therewith; a pilot valve disposed on the switch; a base formed at a bottom of the housing and including an axial tunnel member open to an end, a sixth hole open to top and bottom and communicating with the tunnel member, and a seventh hole open to top and bottom and communicating with the tunnel member; and a spring biased check valve disposed at a lower opening of the housing and the base, the check valve communicating with the single-acting through hole.

The above and other objects, features and advantages of the invention will become apparent from the following detailed description taken with the accompanying drawings.

DETAILED DESCRIPTION OF THE INVENTION

Figure 1:
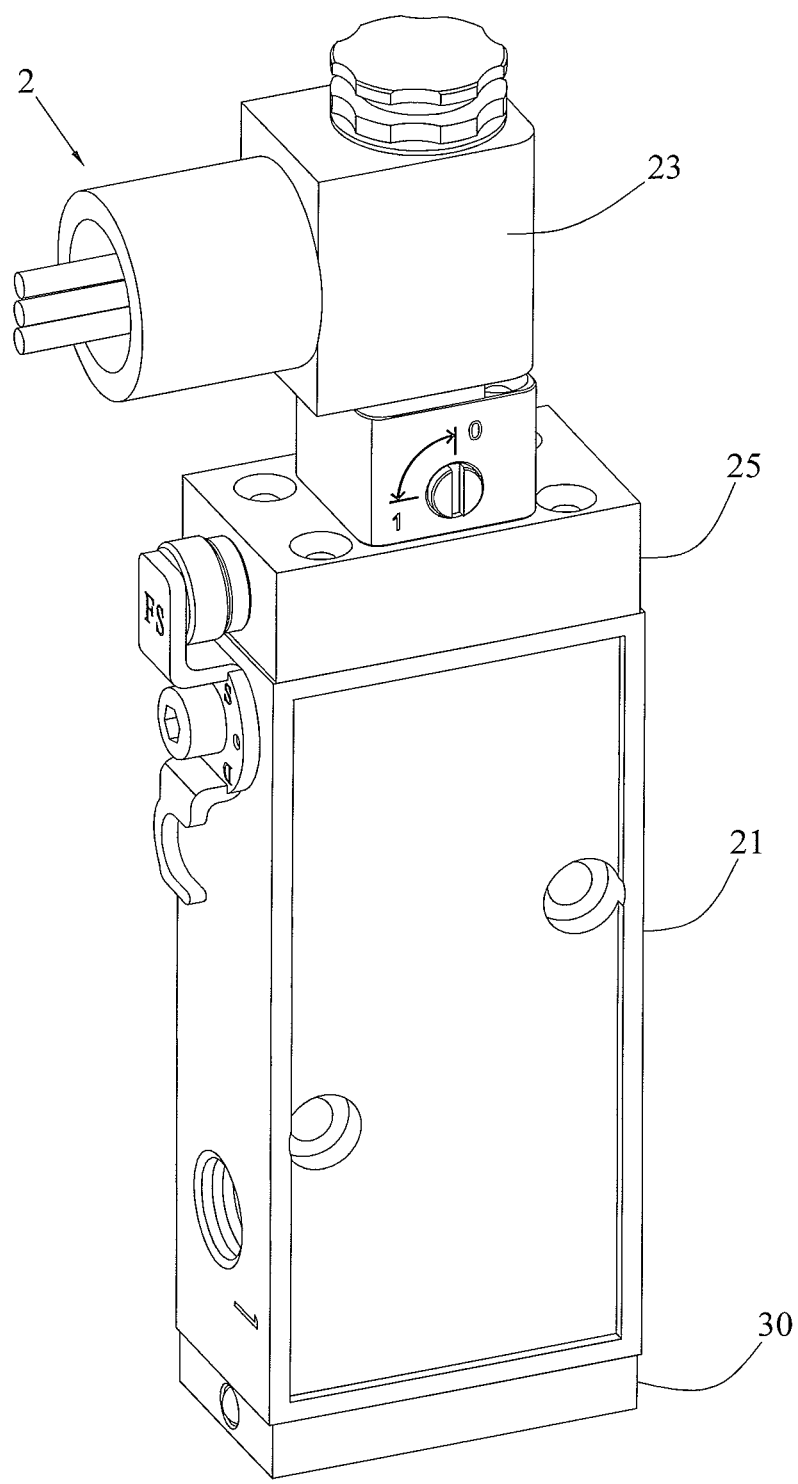
FIG. 1 is a perspective view of a solenoid valve of a pneumatic actuator according to the invention.
Figure 2:
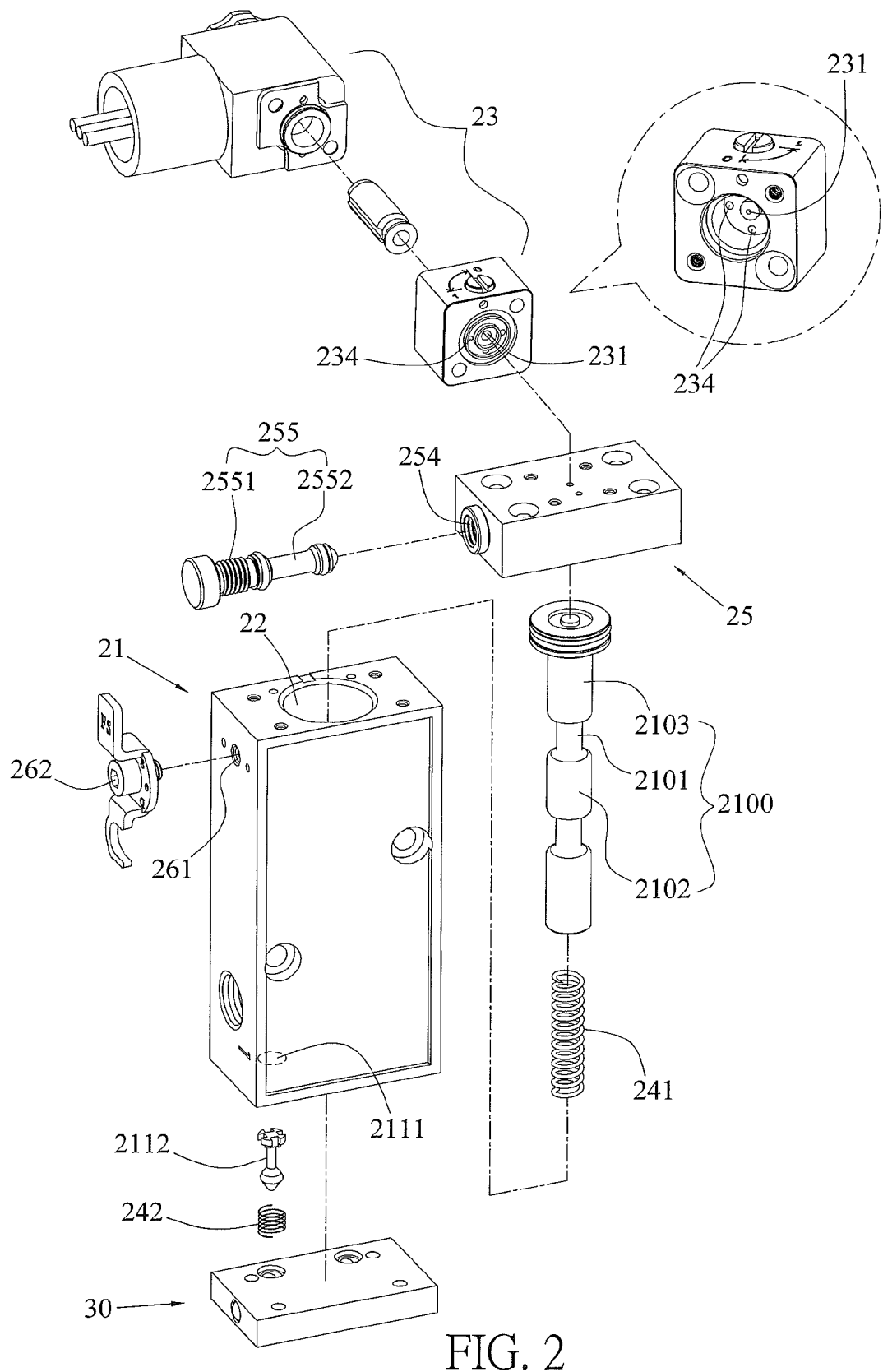
FIG. 2 is an exploded view of FIG. 1.
Figure 3:
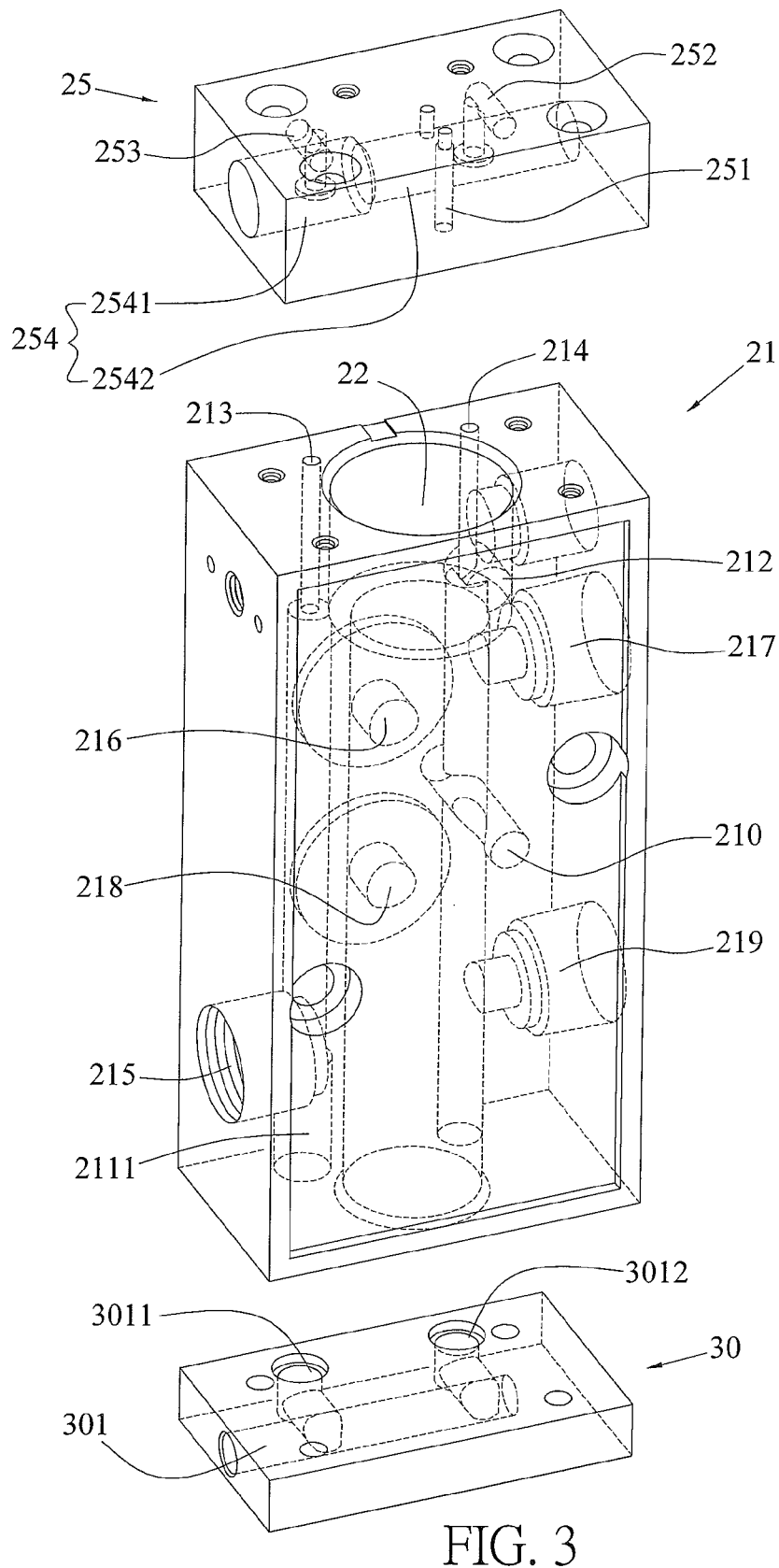
FIG. 3 is an exploded view of some components shown in FIG. 2.
Figure 4:
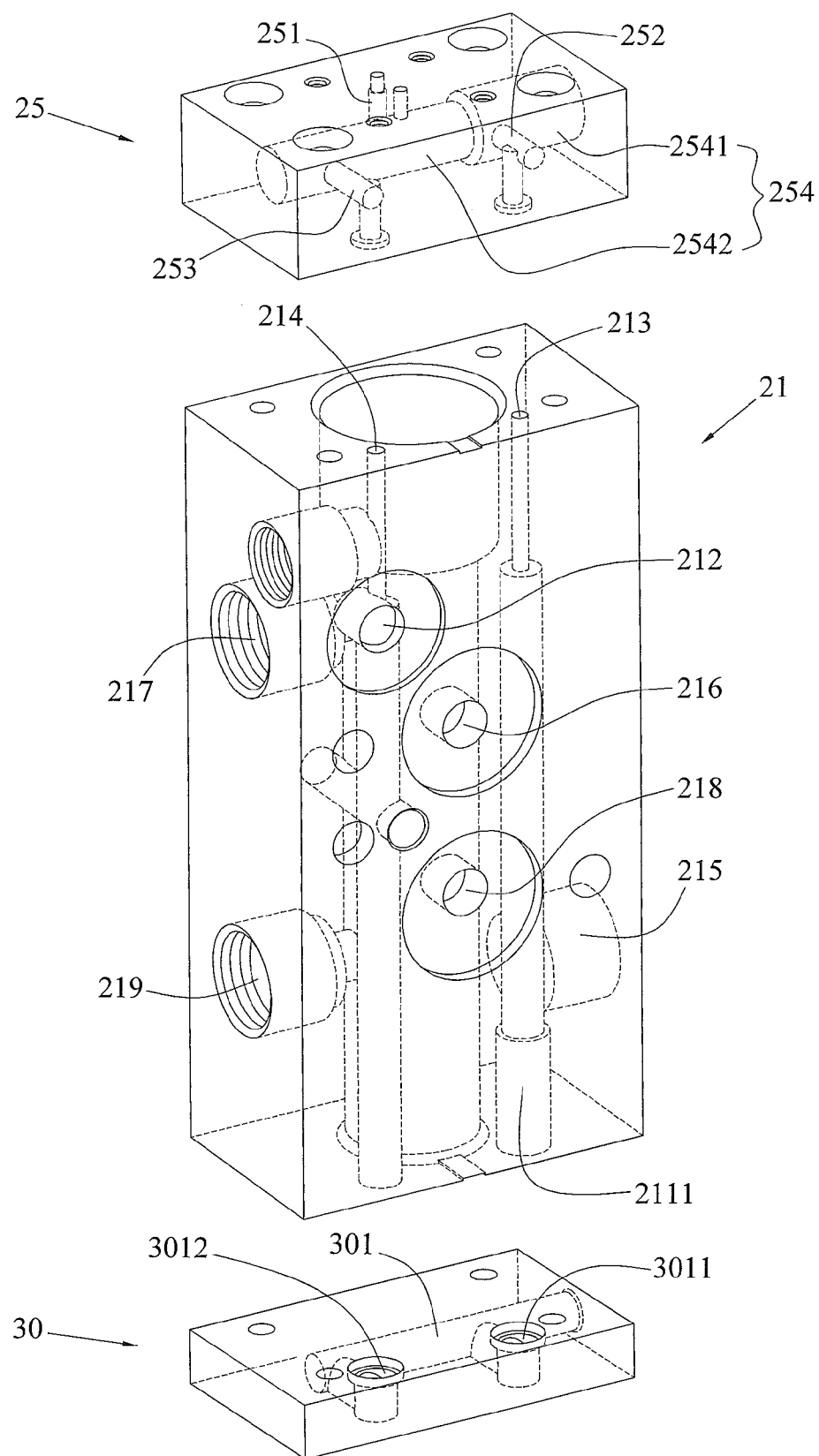
FIG. 4 is another exploded view of FIG. 3.
Figure 5:
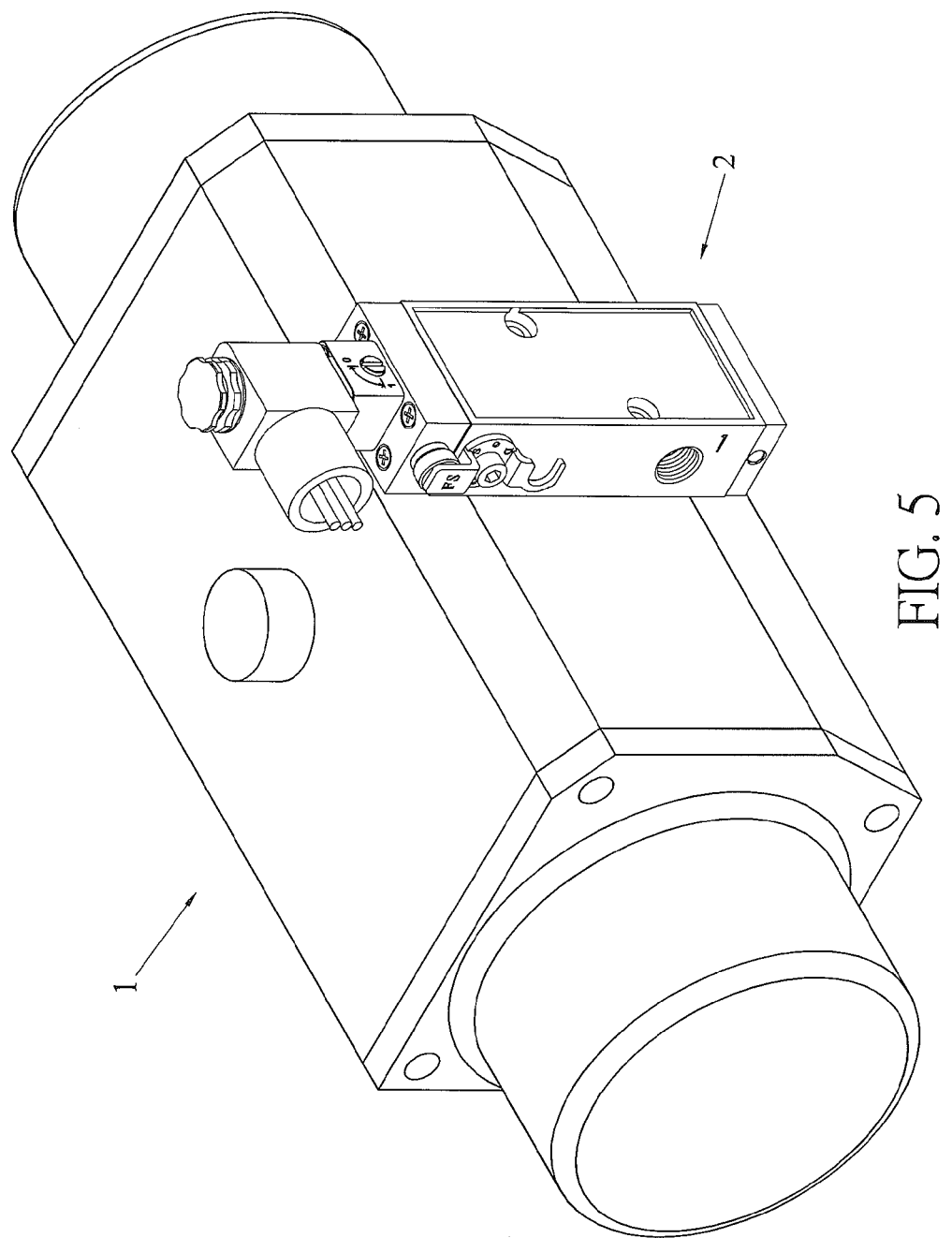
FIG. 5 is a perspective view of assembled pneumatic cylinder and solenoid valve.
Figure 6:
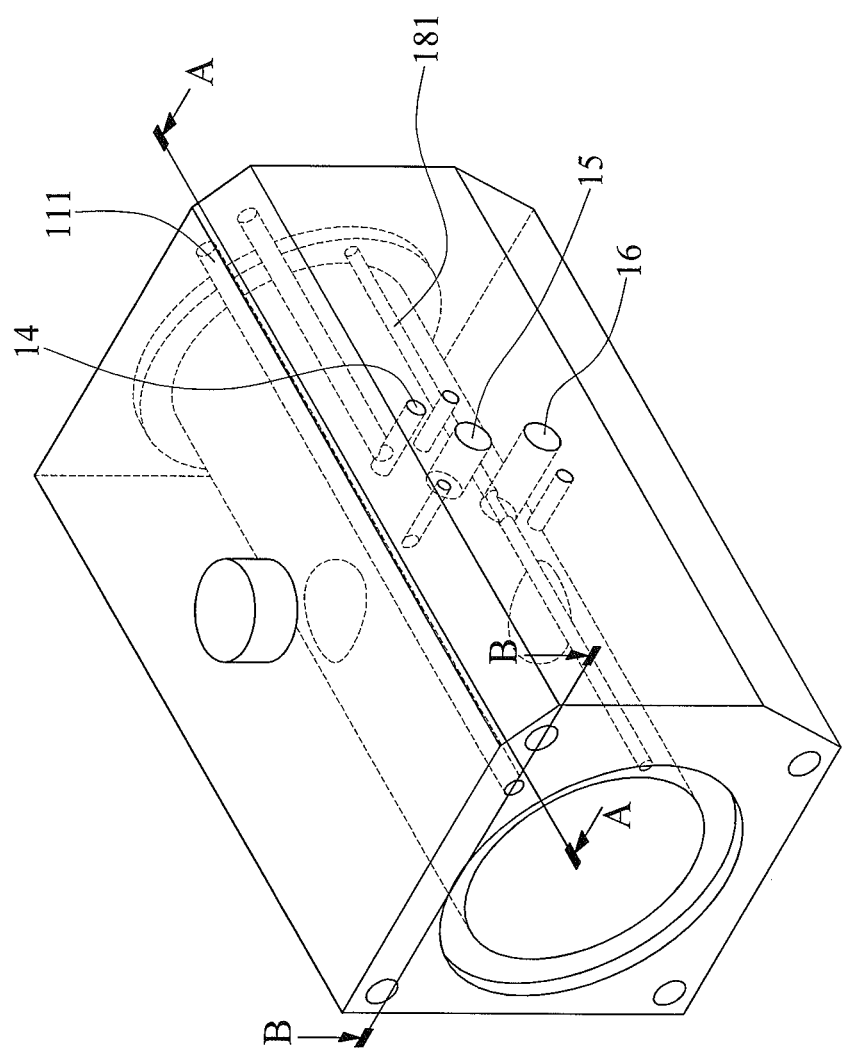
FIG. 6 is a perspective view of the main portion of the pneumatic cylinder of FIG. 5.
Figure 6A:
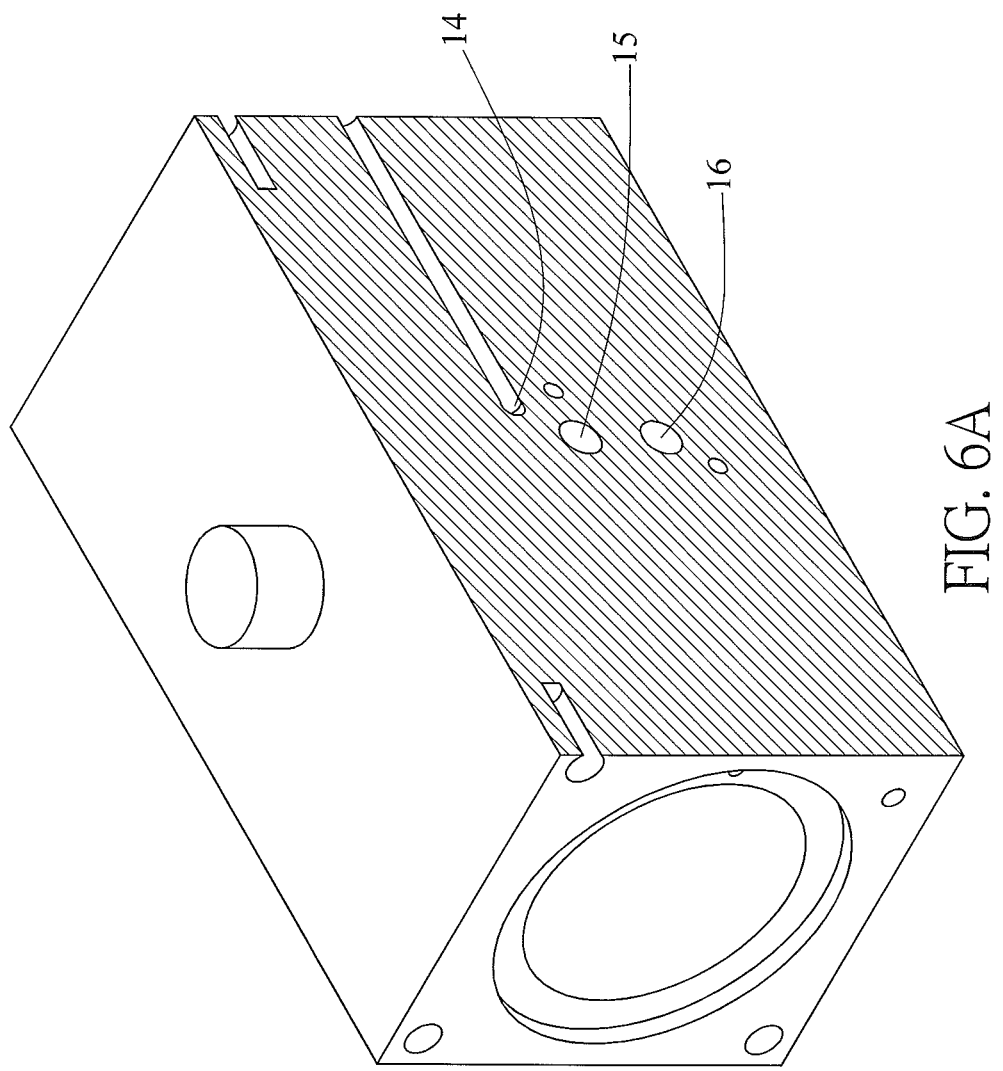
FIG. 6A is a sectional view taken along line A-A of FIG. 6.
Figure 7:
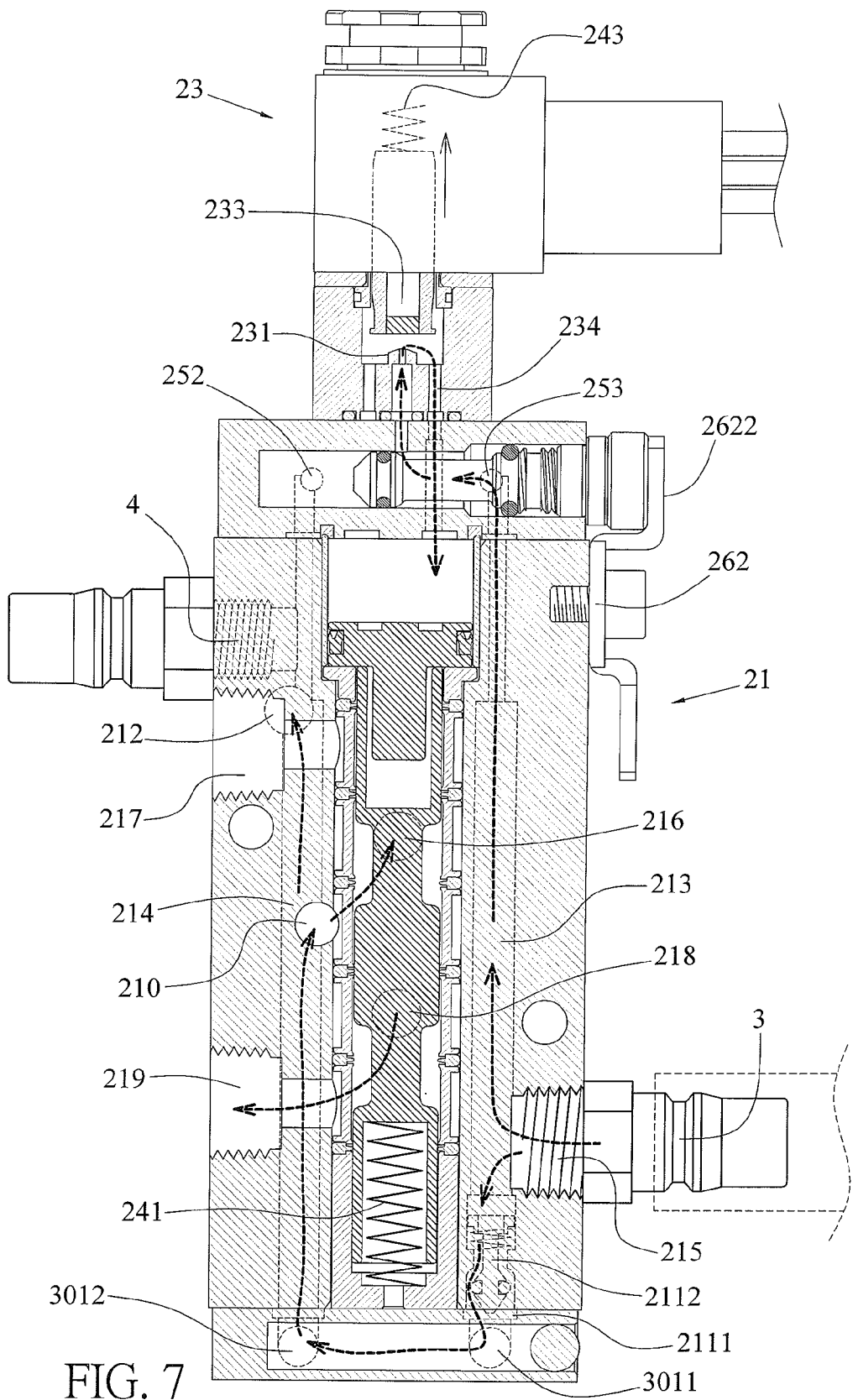
FIG. 7 is a longitudinal sectional view of the pneumatic cylinder showing flow paths of compressed air in a fail-safe mode when the pneumatic cylinder is electrically powered.
Figure 8:
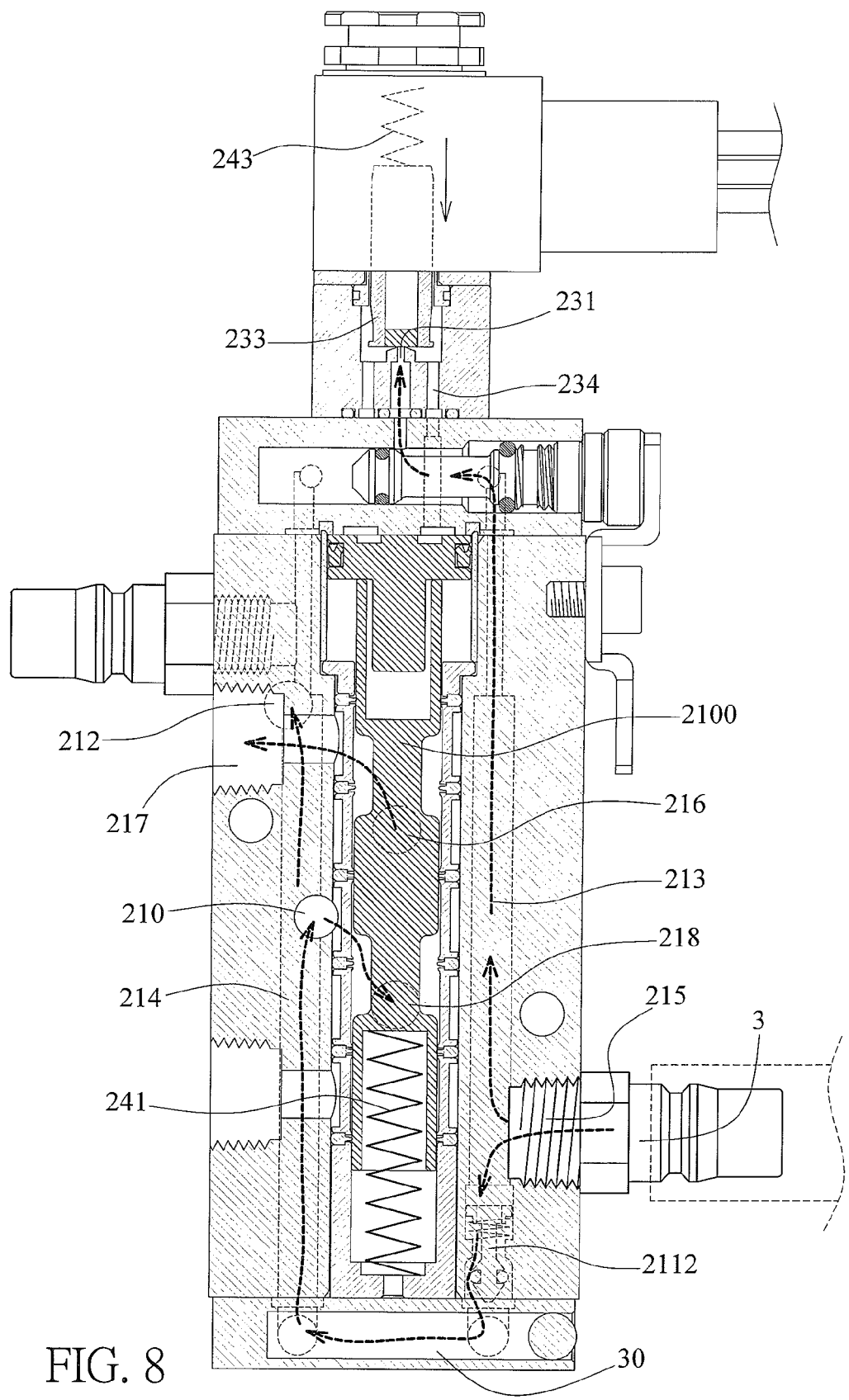
FIG. 8 is a longitudinal sectional view of the pneumatic cylinder showing flow paths of compressed air in the fail-safe mode when the pneumatic cylinder is not electrically powered.
Figure 9A:
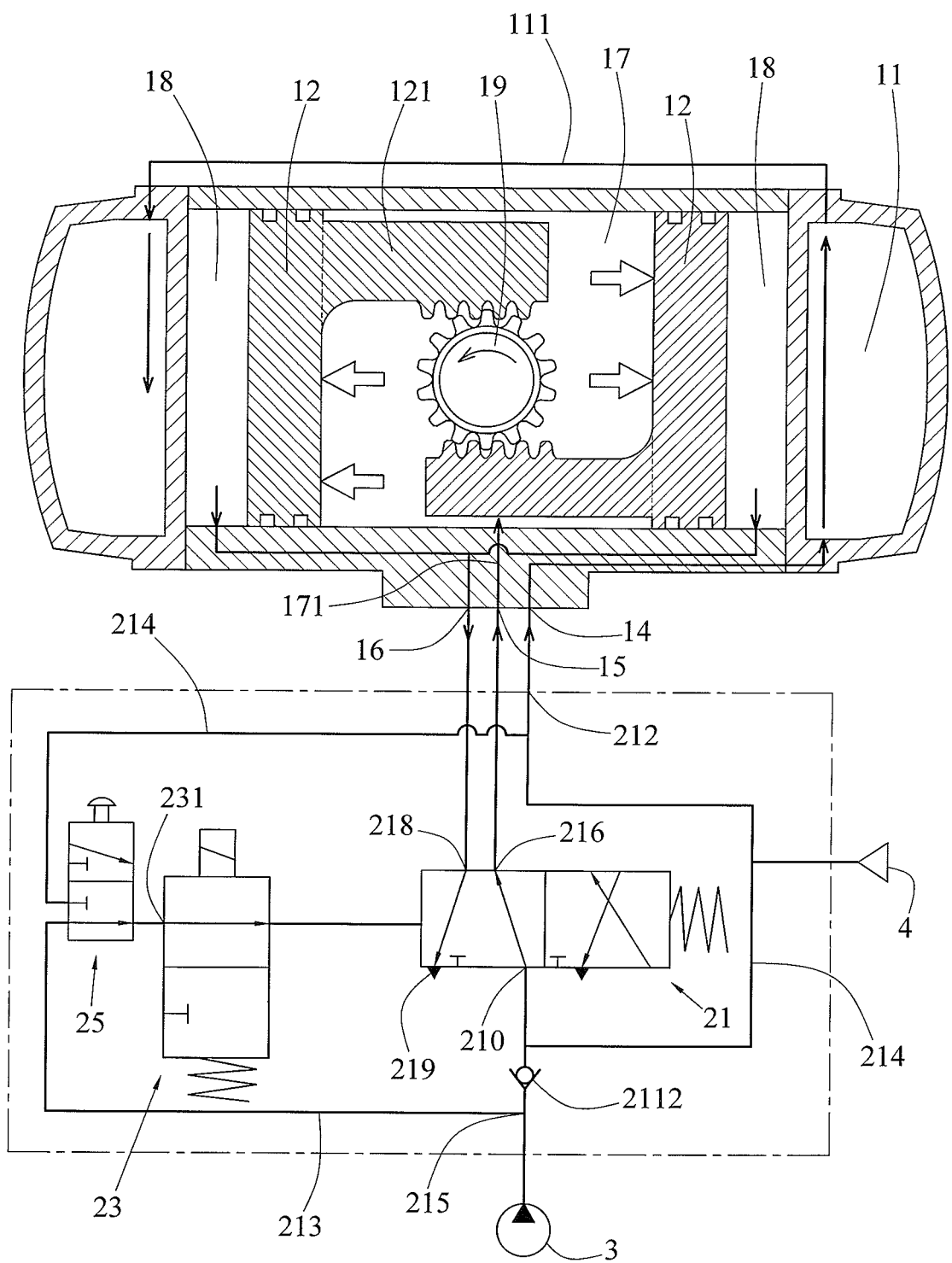
FIG. 9A schematically depicts operations of the solenoid valve and the pneumatic cylinder in the fail-safe mode when the solenoid valve is electrically powered to activate the pneumatic cylinder by supplying compressed air to the pneumatic cylinder.
Figure 9B:
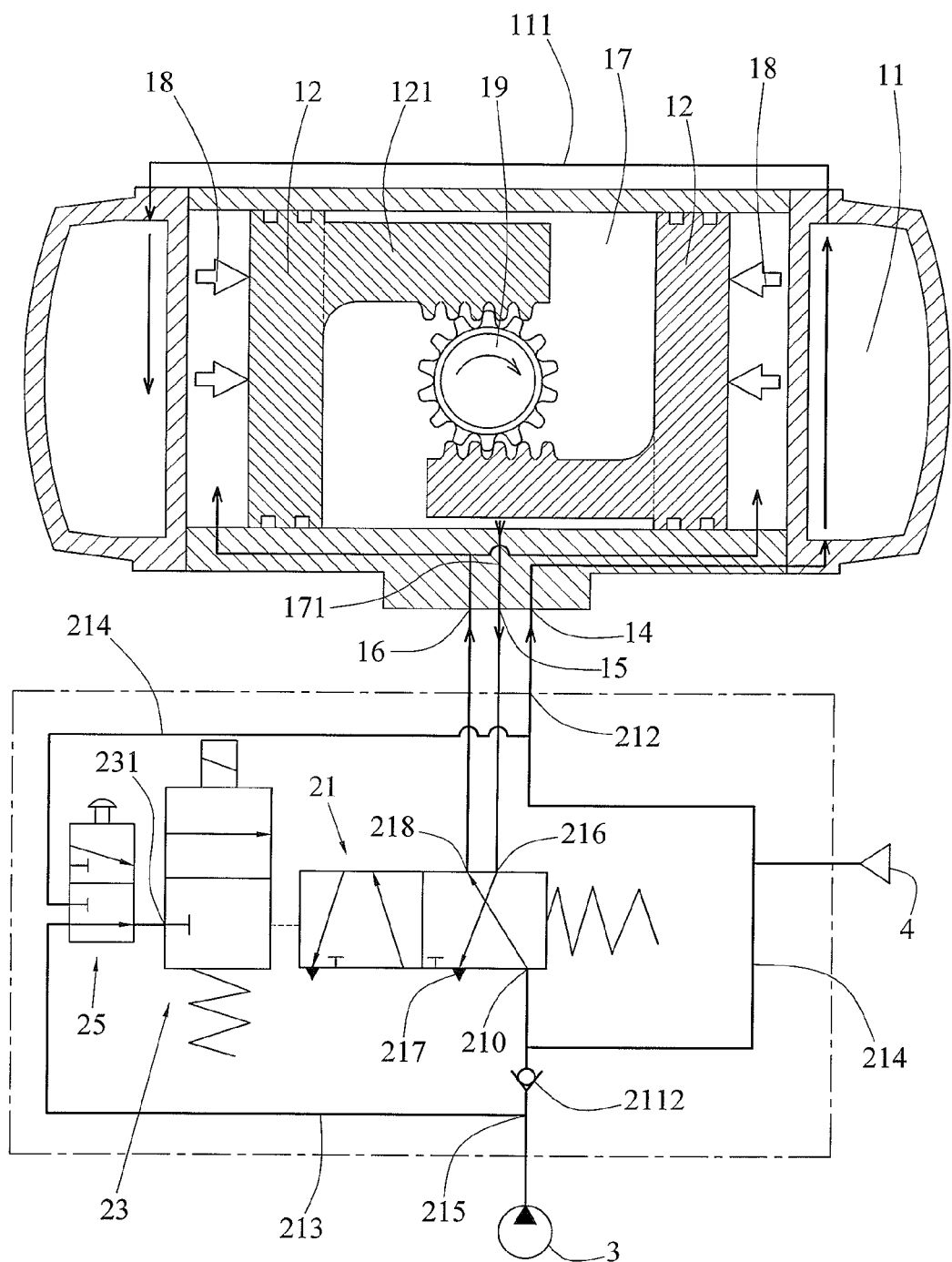
FIG. 9B schematically depicts operations of the solenoid valve and the pneumatic cylinder in the fail-safe mode when the solenoid valve is not electrically powered with compressed air supplied to the pneumatic cylinder.
Figure 9C:
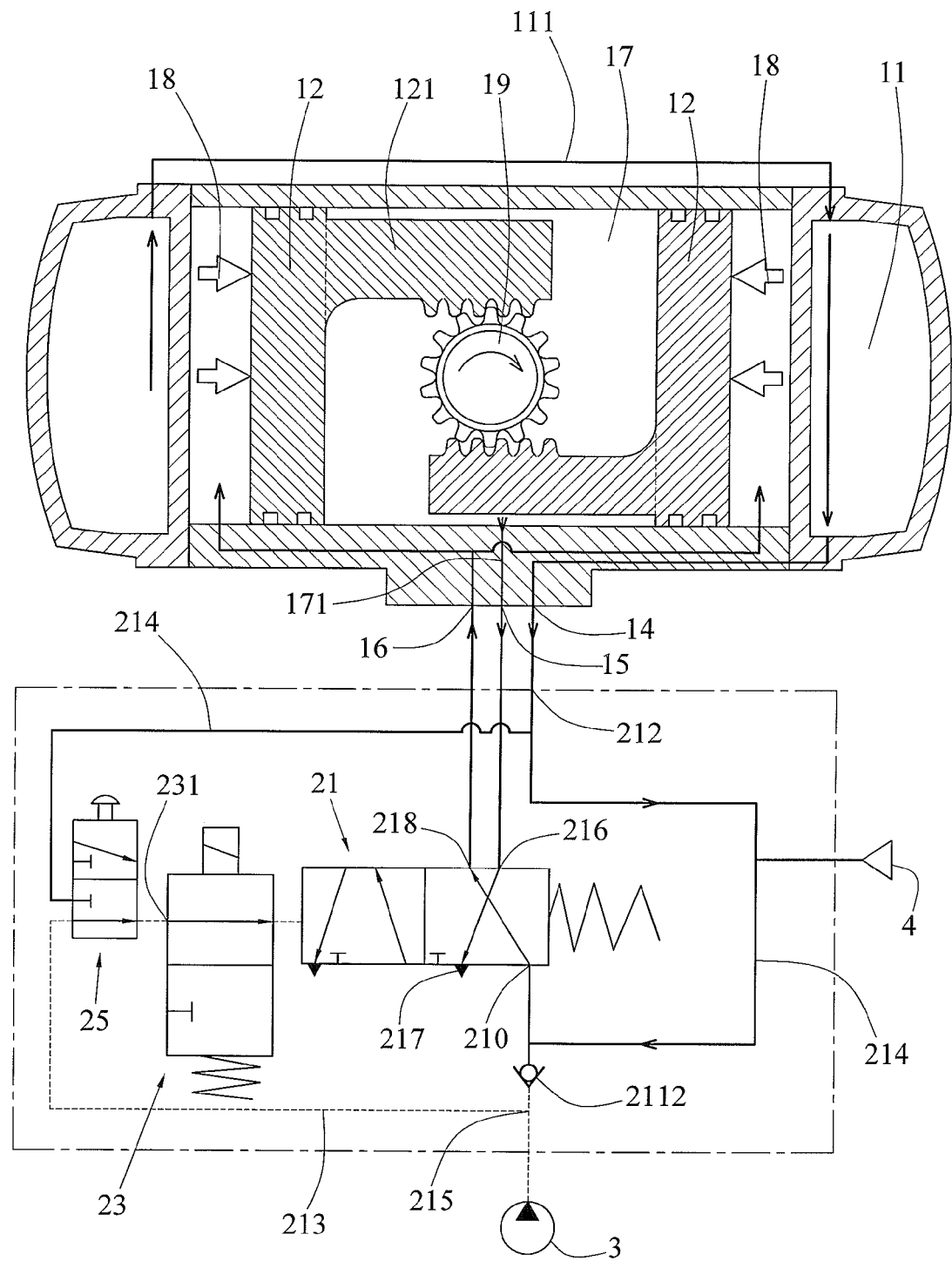
FIG. 9C schematically depicts operations of the solenoid valve and the pneumatic cylinder in the fail-safe mode when the solenoid valve is electrically powered to activate the pneumatic cylinder but compressed air is not supplied to the pneumatic cylinder.
Figure 10A:
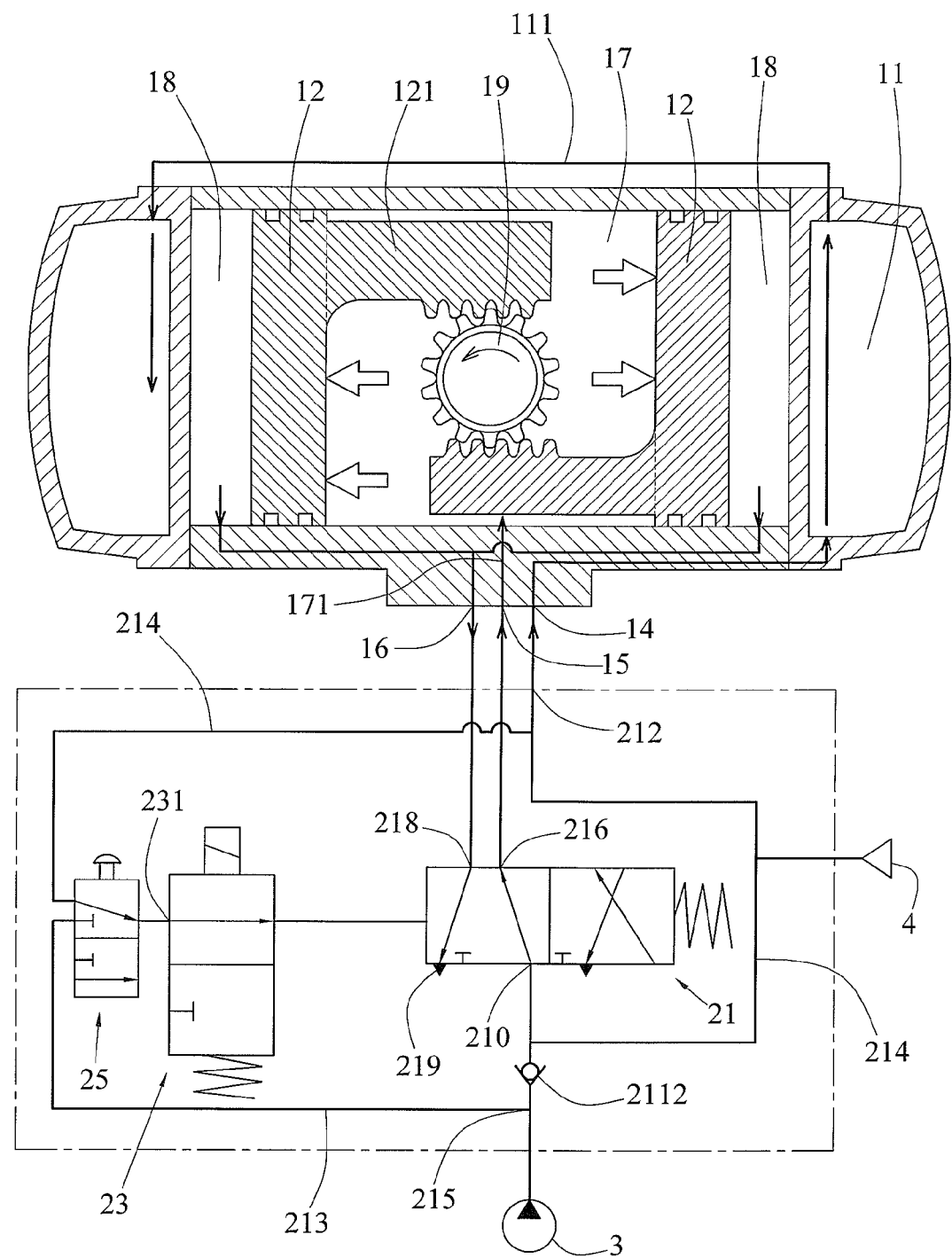
FIG. 10A schematically depicts operations of the solenoid valve and the pneumatic cylinder in a double-acting mode when the solenoid valve is electrically powered to activate the pneumatic cylinder by supplying compressed air to the pneumatic cylinder.
Figure 10B:
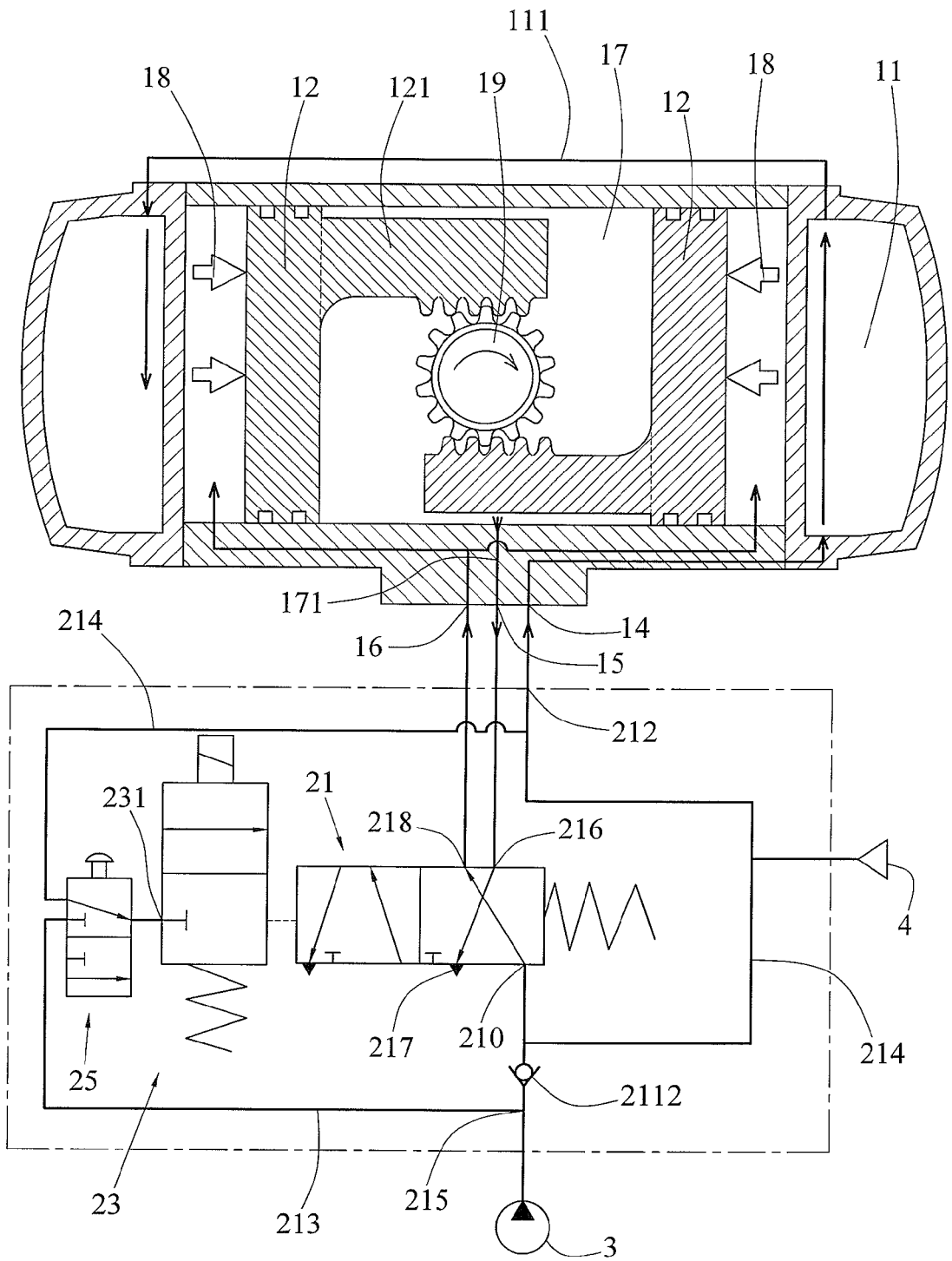
FIG. 10B schematically depicts operations of the solenoid valve and the pneumatic cylinder in the double-acting mode when the solenoid valve is not electrically powered with compressed air supplied to the pneumatic cylinder.
Figure 10C:
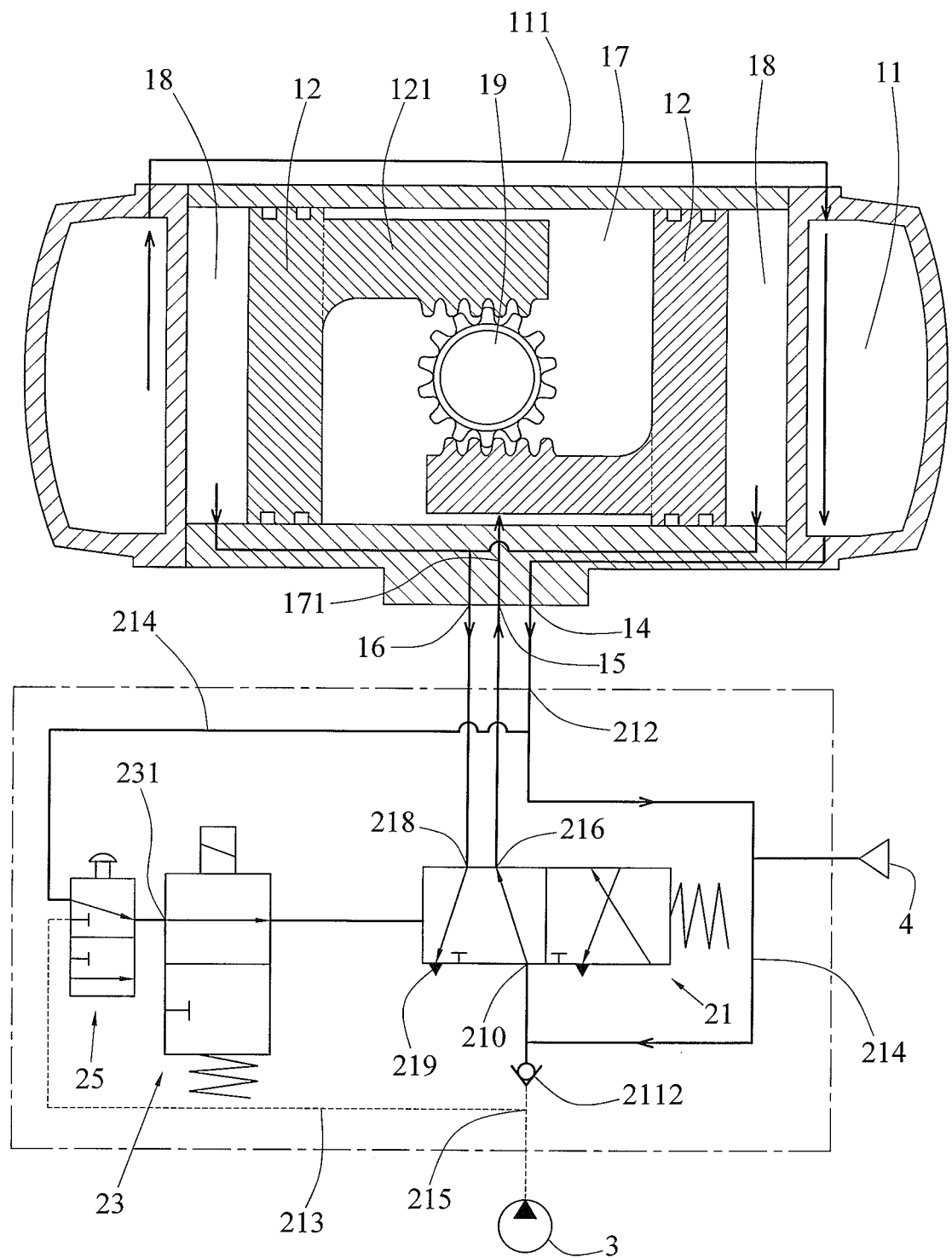
FIG. 10C schematically depicts operations of the solenoid valve and the pneumatic cylinder in the double-acting mode when the solenoid valve is electrically powered to activate the pneumatic cylinder but compressed air is not supplied to the pneumatic cylinder.
Figure 11:
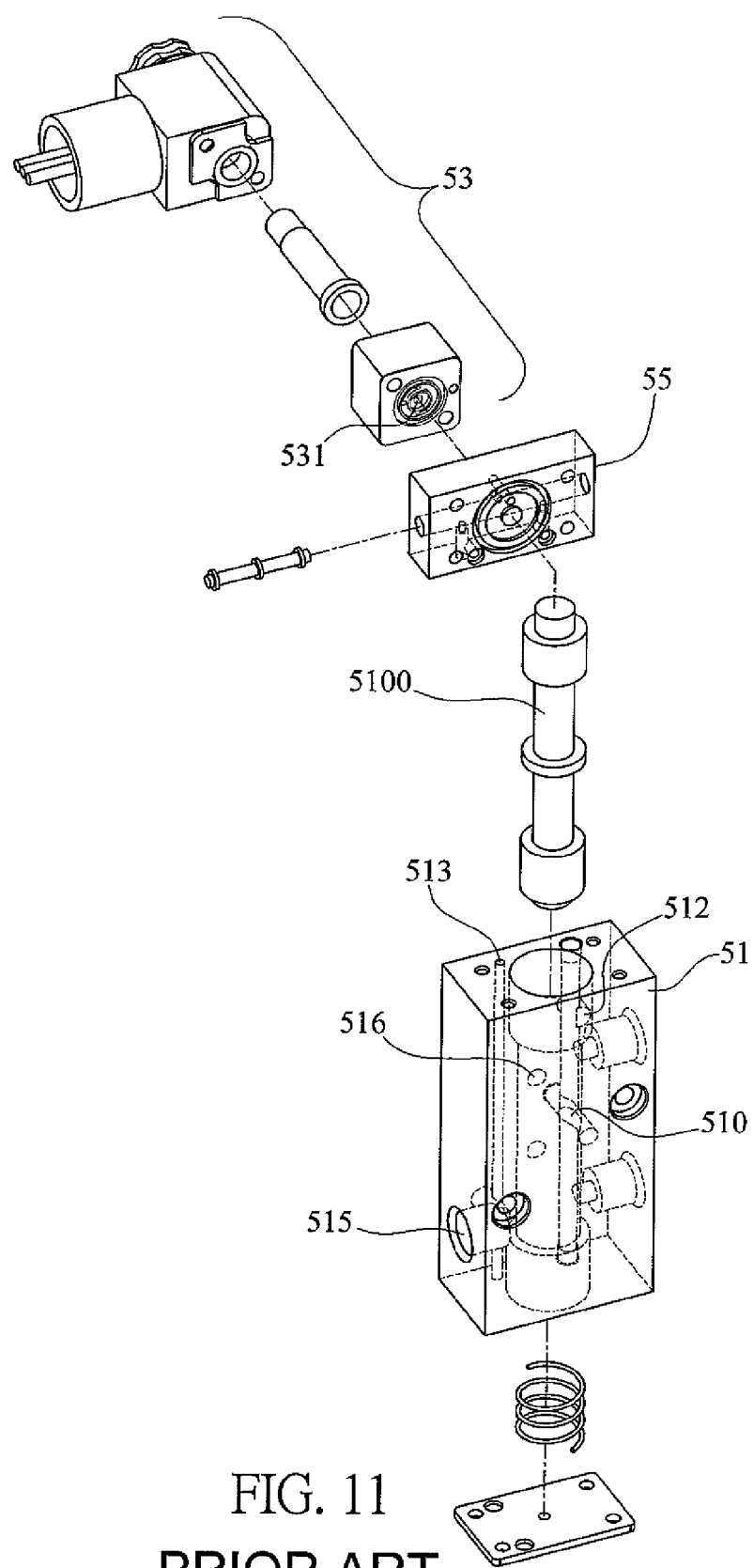
FIG. 11 is an exploded view of a conventional solenoid valve.
Figure 12:
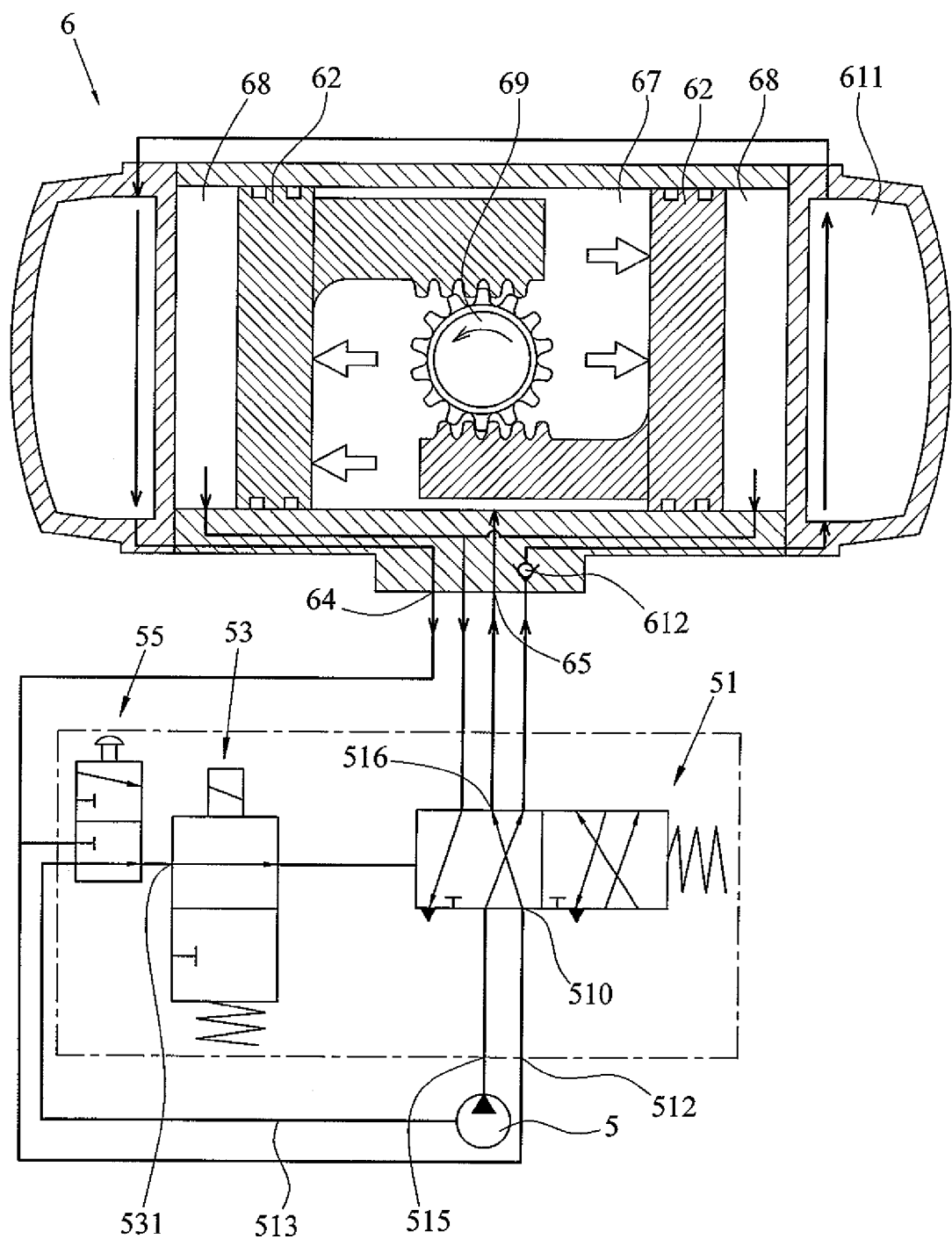
FIG. 12 schematically depicts operations of the solenoid valve and the pneumatic cylinder in a fail-safe mode when the solenoid valve is electrically powered with compressed air supplied to the pneumatic cylinder.

Referring to FIGS. 1 to 10C, a pneumatic actuator in accordance with the invention comprises the following components as discussed in detail below.

A solenoid valve 2 comprises a parallelepiped housing 21 including a longitudinal channel 22, a longitudinal single-acting through hole 213 adjacent to the channel 22, a longitudinal double-acting through hole 214 adjacent to the channel 22, a spool 2100 in the channel 22, a lateral outlet 212 communicating with the double-acting through hole 214, a hole element 210 passing through an edge of the channel 22 to communicate with both the double-acting through hole 214 and the channel 22, the hole element 210 configured to communicate with a second hole 216 or a fourth hole 218 in response to the spool 2100 being pressed by a pilot valve 23, a first hole 215 open to an outer surface of the housing 21, a second hole 216 open to the outer surface of the housing 21, a third hole 217 open to the outer surface of the housing 21, a fourth hole 218 open to the outer surface of the housing 21, and a fifth hole 219 open to the outer surface of the housing 21. The first hole 215 communicates with the single-acting through hole 213. The second hole 216, the third hole 217, the fourth hole 218, and the fifth hole 219 communicate with the channel 22. The first hole 215 serves as an air inlet of the housing 21. The third hole 217 and the fifth hole 219 serve as air outlet of the housing 21.

A switch 25 is provided on the housing 21 and includes an axial tunnel 254 having threads 2541 adjacent to one open end and a reduction part 2542 extending from the threads 2541 to the other open end, a single-acting hole 253 communicating one side with the threads 2541, a double-acting hole 252 communicating one side with the reduction part 2542, a linking hole 251 perpendicular to the tunnel 254 but not communicating therewith, and a shaft 255 having threads 2551 threadedly secured to the threads 2541, and a reduction section 2552 disposed in the reduction part 2542.

A base 30 is formed integrally with a bottom of the housing 21 and includes an axial tunnel 301 open to one end, a sixth hole 3011 open to top and bottom and communicating with the tunnel 301, and a seventh hole 3012 open to top and bottom and communicating with the tunnel 301. The pilot valve 23 is provided on the switch 25 and includes a 2A hole 231 configured to be open or close by activating a switch element, two passages 234 configured to open or close in response to the opening or close of the 2A hole 231, a third spring 243, and a block member 233 having one end biased by the spring 243 and the other end facing the 2A hole 231. A relief valve 4 is mounted on one side of the housing 21. A U-shaped fastening member 262 is threadedly secured to a thread hole 261 of the housing 21 and includes two wings 2622 in which one wing 2622 is pressed on the head of the shaft 255 to fasten the shaft 255 by rotating the fastening member 262. The spool 2100 includes an intermediate enlargement 2102, an end enlargement 2103, and two recessed sections 2101 at two ends of the intermediate enlargement 2102 respectively. The spool 2100 is disposed in the channel 22. A first spring 241 has one end anchored in the channel 22 and the other end urging against a hollow portion of the spool 2100 to make the spool 2110 a spring biased member. A spring 242 is anchored in the sixth hole 3011. A check valve 2112 is disposed at a lower opening 2111 communicating with the single-acting through hole 213 and has one end urged by the spring 242. Alternatively, the check valve 2112 can be provided in the double-acting through hole 214. A space is formed between the top of the spool 2100 and the top end of the channel 22.

A pneumatic cylinder 1 comprises two second spaces 18, two end air chambers 11, two opposite pistons 12 each having a rack 121, a pinion 19 engaging teeth of the racks 121, a first space 17 between the pistons 12, a lengthwise connection line 111, a first line 171, a second line 181, a 1B hole 14, a 1C hole 15, and a 1D hole 16.

As shown in FIGS. 2-7 and 9A specifically, the solenoid valve 2 is switched to a fail-safe mode. In response to electrically powering the solenoid valve 2, the block member 233 retracts to unblock the 2A hole 231. Next, a compressed air source 3 supplies compressed air to the housing 21. The air further passes through the first hole 215 to flow to the single-acting through hole 213 and the check valve 2112 respectively. The air passing through the single-acting through hole 213 flows through the single-acting hole 253 to the 2A hole 231. The air further flows through the passages 234 to push down the spool 2100 by compressing the first spring 241. And in turn, the intermediate enlargement 2102 blocks the second hole 216 from the fourth hole 218. The air passing through the check valve 2112 flows to the double-acting through hole 214 via the sixth hole 3011, the tunnel 301, and the seventh hole 3012. After the air reaching the hole element 210, a portion thereof flows to one chamber 11 via the outlet 212 and the 1B hole 14. The air further flows from one air chamber 11 to the other air chamber 11 via the connection line 111. The remaining portion of the air flows to the first space 17 over the recessed sections 2101 and through the second hole 216 and the 1C hole 15. The air pushes the pistons 12 away from each other. And in turn, the pinion 19 rotates counterclockwise due to engagement with the racks 121. As a result, the pneumatic cylinder 1 is open. Air in the second spaces 18 is compressed by the pistons 12 to flow out of the pneumatic cylinder 1 via the 1D hole 16, the fourth hole 218, and the fifth hole 219.

As shown in FIGS. 2-6, 8, and 9B specifically, the solenoid valve 2 is switched to the fail-safe mode. In response to electrically deactivating the solenoid valve 2, the block member 233 is pushed by the expanding third spring 243 to block the 2A hole 231. Next, the compressed air source 3 supplies compressed air to the housing 21. The air further passes through the first hole 215 to flow to the single-acting through hole 213 and the check valve 2112 respectively. The air passing through the single-acting through hole 213 flows through the single-acting hole 253 to reach the blocked 2A hole 231. The air passing through the check valve 2112 flows to the double-acting through hole 214 via the sixth hole 3011, the tunnel 301, and the seventh hole 3012. After the air reaching the hole element 210, a portion thereof flows to one chamber 11 via the outlet 212 and the 1B hole 14. The air further flows from one air chamber 11 to the other air chamber 11 via the connection line 111. The remaining portion of the air flows to the second spaces 18 over the recessed sections 2101 and through the fourth hole 218. The air pushes the pistons 12 toward each other. And in turn, the pinion 19 rotates clockwise due to engagement with the racks 121. As a result, the pneumatic cylinder 1 is closed. Air in the first spaces 17 is compressed by the pistons 12 to flow out of the pneumatic cylinder 1 via the first line 171, the IC hole 15, the second hole 216, and the third hole 217.

Figure 6B:
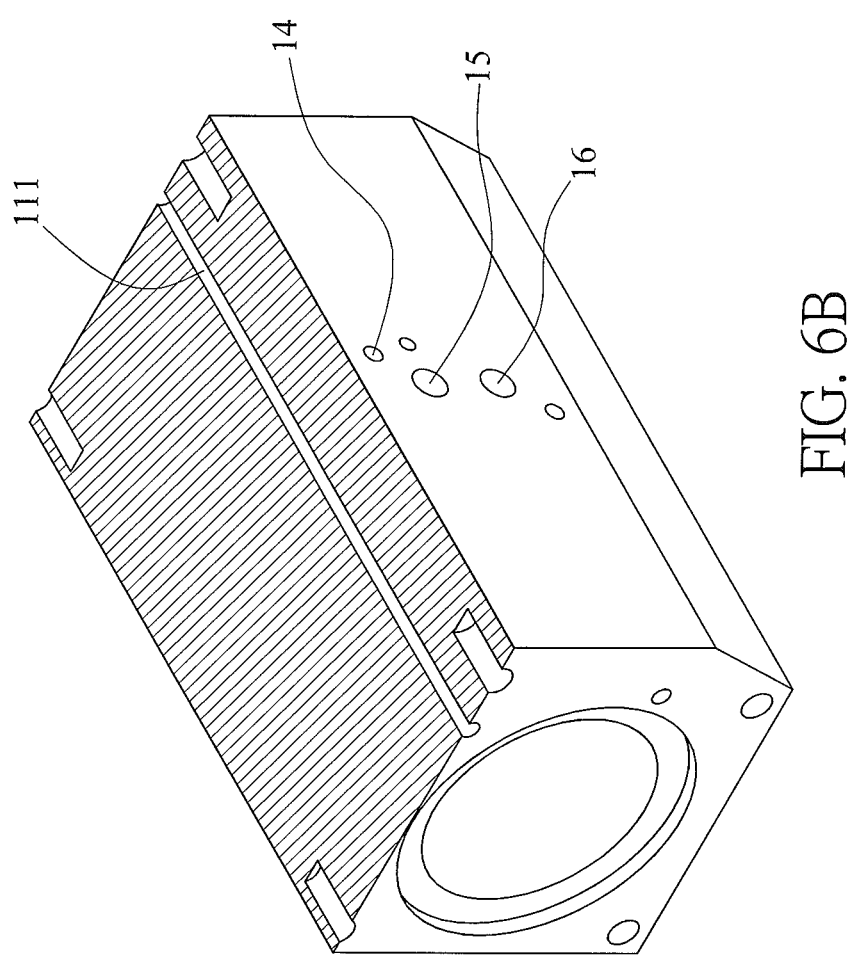
FIG. 6B is a sectional view taken along line B-B of FIG. 6.

As shown in FIGS. 2-6B and 9C specifically, the solenoid valve 2 is switched to the fail-safe mode. In response to electrically activating the solenoid valve 2 with the compressed air source 3 being deactivated and the compressed air in the air chambers 11 served as the source of compressed air. The air leaving the air chambers 11 passes through the 1B hole 14 and the outlet 212 to enter double-acting through hole 214. And in turn, the air passes through the hole element 210. The spool 2100 is not pressed by the air. Thus, the first spring 241 compresses to move the spool 210 upward. Thus, the air leaving the hole element 210 flows to the second spaces 18 via the fourth hole 218 and the 1D hole 16. The air pushes the pistons 12 toward each other. And in turn, the pinion 19 rotates clockwise due to engagement with the racks 121. As a result, the pneumatic cylinder 1 is closed. Air in the first spaces 17 is compressed by the pistons 12 to flow out of the pneumatic cylinder 1 via the IC hole 15, the second hole 216, and the third hole 217.

As shown in FIGS. 2-8 and 10A specifically, the solenoid valve 2 is switched to a double-acting mode by manipulating the shaft 255. In response to electrically powering the solenoid valve 2, the block member 233 retracts to unblock the 2A hole 231. Next, the compressed air source 3 supplies compressed air to the housing 21. The air further passes through the first hole 215 to flow to the double-acting through hole 214 via the check valve 2112. After the air reaching the hole element 210, a portion thereof flows to one chamber 11 via the outlet 212 and the 1B hole 14. The air further flows from one air chamber 11 to the other air chamber 11 via the connection line 111. The remaining portion of the air flows to the double-acting hole 252. And in turn, the air passes through the 2A hole 231 and the passages 234 to push down the spool 2100. And in turn, the intermediate enlargement 2102 blocks the second hole 216 from the fourth hole 218. The remaining portion of the air flows to the first space 17 over the recessed sections 2101 and through the second hole 216 and the 1C hole 15. The air pushes the pistons 12 away from each other. And in turn, the pinion 19 rotates counterclockwise due to engagement with the racks 121. As a result, the pneumatic cylinder 1 is open. Air in the second spaces 18 is compressed by the pistons 12 to flow out of the pneumatic cylinder 1 via the 1D hole 16, the fourth hole 218, and the fifth hole 219.

As shown in FIGS. 2-8 and 10B specifically, the solenoid valve 2 is switched to the double-acting mode by manipulating the shaft 255. In response to electrically deactivating the solenoid valve 2, the block member 233 is pushed by the expanding third spring 243 to block the 2A hole 231. Next, the compressed air source 3 supplies compressed air to the housing 21. The air further passes through the first hole 215 to flow to the check valve 2112. The air passing through the check valve 2112 enters the double-acting through hole 214. After the air reaching the hole element 210, a portion thereof flows to one chamber 11 via the outlet 212 and the 1B hole 14. The air further flows from one air chamber 11 to the other air chamber 11 via the connection line 111. The remaining portion of the air flows through the double-acting hole 242 to be blocked at the closed 2A hole 231. After the air flowing through the hole element 210, a portion thereof flow through the outlet 212 and the 1B hole 14 into the air chambers 11. The remaining air flows to the second spaces 18 over the recessed sections 2101 and through the fourth hole 218. The air pushes the pistons 12 toward each other. And in turn, the pinion 19 rotates clockwise due to engagement with the racks 121. As a result, the pneumatic cylinder 1 is closed. Air in the first spaces 17 is compressed by the pistons 12 to flow out of the pneumatic cylinder 1 via the first line 171, the IC hole 15, the second hole 216, and the third hole 217.

As shown in FIGS. 2-8 and 10C specifically, the solenoid valve 2 is switched to the double-acting mode by manipulating the shaft 255. In response to electrically activating the solenoid valve 2 with the compressed air source 3 being deactivated and the compressed air in the air chambers 11 served as the source of compressed air. The air leaving the air chambers 11 passes through the 1B hole 14 and the outlet 212 to enter the double-acting through hole 214. And in turn, a portion of the air flows through the switch 25, the 2A hole 231, and the passages 234 to push down the spool 2100. And in turn, the intermediate enlargement 2102 blocks the second hole 216 from the fourth hole 218. The remaining portion of the air flows to the first space 17 over the recessed sections 2101 and through the second hole 216 and the 1C hole 15. The pistons 12 do not move due balance of air pressure between the first space 17 and each of the second spaces 18. As a result, the pneumatic cylinder 1 is open.

The invention has the following advantage: After adding lubricating oil to the solenoid valve 2, gas or moisture may enter the first space 17 to lubricate the racks 121 and the pinion 19, and enter the second spaces 18 to lubricate the pistons 12. This can prevent gas or moisture from accumulating in the air chambers 11 to greatly decrease space of the air chambers 11, and the lubricating oil or moisture is unable to reach the first and second spaces 17, 18 as experienced by the prior art.

While the invention has been described in terms of preferred embodiments, those skilled in the art will recognize that the invention can be practiced with modifications within the spirit and scope of the appended claims.

What is claimed is:

1. A solenoid valve comprising:
   a housing including a longitudinal channel, a longitudinal single-acting through hole, a longitudinal double-acting through hole, a spring biased spool disposed in the channel, a lateral outlet communicating with the double-acting through hole, a hole element passing through an edge of the channel to communicate with both the double-acting through hole and the channel, a first hole open to an outer surface of the housing, a second hole open to the outer surface of the housing, a third hole open to the outer surface of the housing, a fourth hole open to the outer surface of the housing, and a fifth hole open to the outer surface of the housing wherein the second hole, the third hole, the fourth hole, and the fifth hole communicate with the channel;
   a switch disposed on the housing and including an axial tunnel, a shaft disposed in the tunnel, a lateral single-acting hole communicating with the tunnel, a lateral double-acting hole communicating with the tunnel, and a linking hole perpendicular to the tunnel but not communicating therewith;
   a pilot valve disposed on the switch;
   a base formed at a bottom of the housing and including an axial tunnel member open to an end, a sixth hole open to top and bottom and communicating with the tunnel member, and a seventh hole open to top and bottom and communicating with the tunnel member; and
   a spring biased check valve disposed at a lower opening of the housing and the base, the check valve communicating with the single-acting through hole.

2. The solenoid valve of claim 1, wherein the tunnel includes threads adjacent to an open end and a reduction section extending from the threads, wherein the single-acting hole communicates with the threads, and wherein the double-acting hole communicates with the reduction section.

3. The solenoid valve of claim 1, further comprising a fastening member secured to a thread hole of the housing.

4. The solenoid valve of claim 3, wherein the fastening member is U-shaped and includes two wings, one of the wings being pressed on the shaft to fasten the shaft by rotating the fastening member.

5. The solenoid valve of claim 1, wherein the shaft includes threads and a reduction part.

6. The solenoid valve of claim 1, further comprising a relief valve mounted on the housing.

7. The solenoid valve of claim 1, wherein the base is formed integrally with the bottom of the housing.

* * * * *